United States Patent [19]

Walton

[11] Patent Number: 5,572,988

[45] Date of Patent: Nov. 12, 1996

[54] SOLAR ABSORBER ASSEMBLIES

[75] Inventor: Robert N. Walton, Nerang, Australia

[73] Assignee: Neumann Steel PTY, Ltd., Queensland, Australia

[21] Appl. No.: 284,469

[22] PCT Filed: Sep. 9, 1992

[86] PCT No.: PCT/AU92/00481

§ 371 Date: Aug. 16, 1994

§ 102(e) Date: Aug. 16, 1994

[87] PCT Pub. No.: WO93/18353

PCT Pub. Date: Sep. 16, 1993

[30] Foreign Application Priority Data

Mar. 9, 1992 [AU] Australia ................. 12106/92

[51] Int. Cl.⁶ ................................. F24J 2/50
[52] U.S. Cl. ............. 126/652; 126/563; 126/655; 126/906
[58] Field of Search ............. 126/652, 651, 126/906, 561–568, 653–657; 165/172–176, 168

[56] References Cited

U.S. PATENT DOCUMENTS

| 2,274,492 | 2/1942 | Modine | 126/271 |
|---|---|---|---|
| 4,069,811 | 1/1978 | Tabor | 126/655 |
| 4,153,041 | 5/1979 | Grauleau et al. | 126/652 |
| 4,191,165 | 3/1980 | Faudarole | 126/628 |
| 4,206,748 | 6/1980 | Goodman | 126/563 |
| 4,211,213 | 7/1980 | Nissen et al. | 126/452 |
| 4,253,445 | 3/1981 | Wilson | 126/652 |
| 4,280,477 | 7/1981 | Divine | 126/416 |
| 4,321,911 | 3/1982 | Offutt | 126/906 |
| 4,381,763 | 5/1983 | Kahl | 126/416 |
| 4,562,884 | 1/1986 | Moeller et al. | 165/76 |
| 4,932,085 | 6/1990 | Saj | 126/563 |

FOREIGN PATENT DOCUMENTS

| 23902/84 | 7/1984 | Australia. | |
|---|---|---|---|
| 16164/83 | 1/1985 | Australia. | |
| 41350/85 | 10/1985 | Australia. | |
| 69030/87 | 8/1987 | Australia. | |
| 66032/86 | 6/1988 | Australia. | |
| 1120807 | 3/1982 | Canada | 126/563 |
| 2 097 114 | 10/1982 | United Kingdom. | |
| 84/02176 | 7/1984 | WIPO. | |

OTHER PUBLICATIONS

Abstract, Q7: Lighting; Heating, Q74, K2427 D/40–EP 36 041.

*Primary Examiner*—James C. Yeung
*Attorney, Agent, or Firm*—Foley & Lardner

[57] ABSTRACT

A solar absorber assembly (13) having upper and lower connectors (14, 15) between which tubes (16) extend for conveying water to be heated, the tubes (16) being surrounded by a glazing assembly (17) which is supported by the connectors (14, 15). The connectors (14, 15) may be connected with adjacent connectors (14, 15) of adjacent assemblies (13) to form a fence panel (11) which can be supported by posts (12), the fence panel (11) also serving as a security fence for swimming pools.

11 Claims, 4 Drawing Sheets

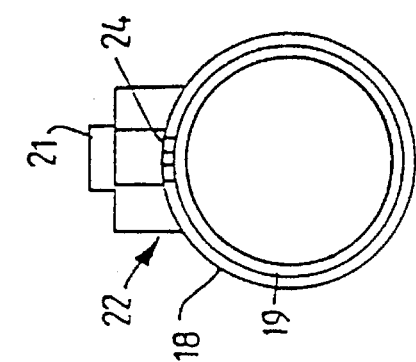
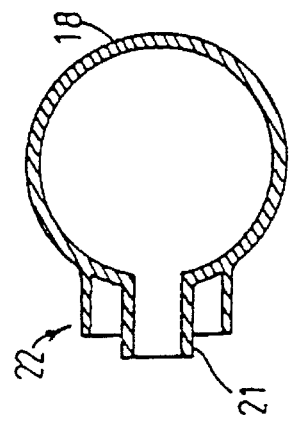
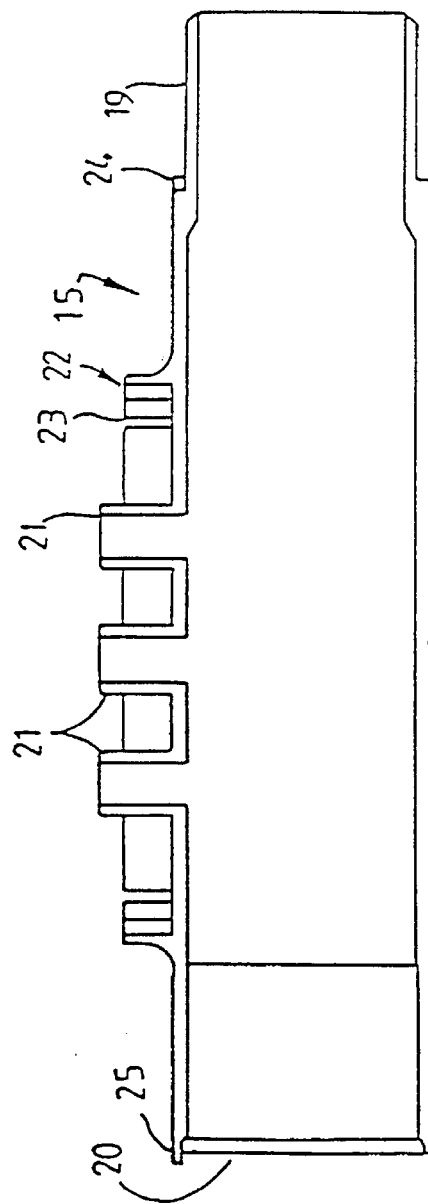
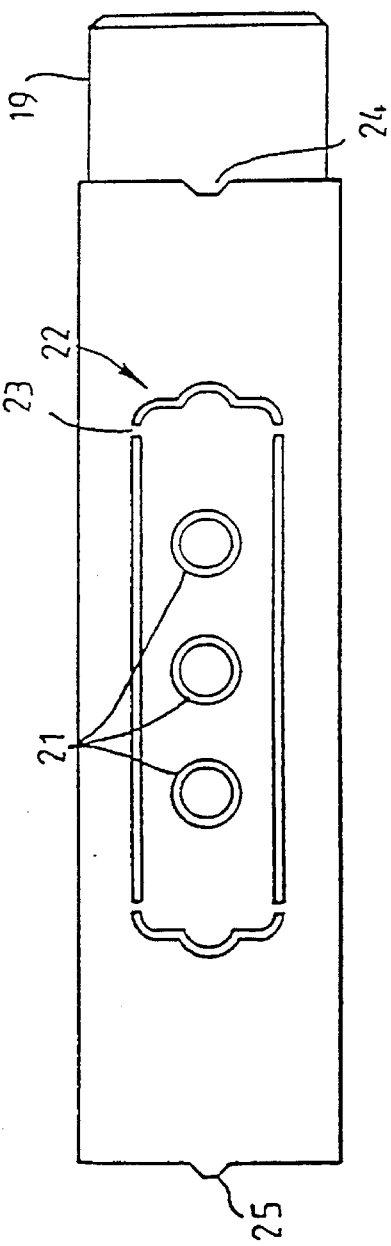

SOLAR ABSORBER ASSEMBLIES

BACKGROUND OF THE INVENTION

(1) Field of the Invention

This invention relates to improvements to solar absorber assemblies and, in particular, to solar absorber assemblies which may be incorporated in or comprise a fence or a fence panel.

(2) Prior Art

Solar absorbers of many different forms are currently available. In one form, such absorbers when applied to use in the heating of swimming pools, comprise multiple tubes which are arranged on an exposed surface and through which water may run or be pumped so as to be heated when the tubes are subject to radiation from the sun. Generally, such absorbers are formed of a flexible plastics material and arranged on the roof of a building. In most swimming pools installations, it is necessary to employ a security fence to prevent the access of unauthorized personnel or children to the pool. Such fences have now in many situations become obligatory even for existing pools. This results in considerable additional expense both to the pool owner with an existing pool and also to the cost of new pool installations.

SUMMARY OF THE INVENTION

The present invention aims to provide a solar absorber assembly which functions efficiently to heat water flowing therethrough.

The present invention also aims to provide a fence panel for forming a fence which may serve as a security fence for swimming pools and which incorporates a solar absorber assembly for use in heating water of swimming pools or any other water supply.

Other objects and advantages of the invention will become apparent from the following description.

With the above and other objects in view, the present invention provides in one aspect, a solar absorber assembly including:

first and second end fittings adapted to be connected to corresponding end fittings of an adjacent said solar absorber assembly;

at least one ducting member extending between said end fittings and connected in fluid communication therewith; and glazing means surrounding said ducting member or members and being supported between said first and second end fittings; wherein:

said glazing means comprises a plurality of hollow glazing assemblies, each receiving said ducting member or members therethrough, each said glazing assembly including first and second parts adapted to be releasably interconnected to surround said ducting member or members.

Preferably, the end fittings include male and female parts adapted for connection to and communication with corresponding parts of an adjacent said fitting. Preferably, said end fittings have a tubular body portion and said male and female parts comprise a tubular spigot portion at one end of the fitting and a tubular socket portion at the other end of the fitting respectively.

Suitably said fittings include a further spigot extending outwardly of the body portion of said fitting for engagement by one end of a ducting member. In a preferred form, the fitting includes more than one further spigot and a plurality of ducting members extend between said spigots of opposite fittings.

Suitably, each fittings include about the further spigot or spigots a skirt to receive and support an end of said glazing assembly. The first and second parts are preferably identical in cross section and include at their opposite longitudinal edges complementary coupling means preferably of male/female form to enable releasable interconnection of the glazing parts.

Preferably, the glazing assembly is constructed so as to support the ducting members along their length. For this purpose, the glazing parts preferably include on the inner side projections which support the ducting members. Preferably, the projections comprise ribs.

The ducting members in one form are of generally tubular construction. To improve heat collection, however, the ducting members are preferably provided with opposite webs which extend diametrically on opposite sides of the ducting members.

In a further aspect, the present invention provides a fencing panel, said fencing panel including a plurality of spaced apart solar absorber assemblies of the above type adapted to be supported in an upright attitude, said absorber assemblies being in fluid communication through their adjacent end fittings. Means are preferably provided for introducing water to the fence panel for passage through the absorber assemblies, said water being heated upon said solar absorber assemblies to the fence panel for passage through the absorber assemblies, said water being heated upon said solar absorber assemblies being exposed to a heat source such as the sun whereby said fencing panel may comprise a solar absorber for the heating of water passing therethrough.

The end fittings of the solar absorber assemblies when interconnected define upper and lower rails for said fencing panel. Preferably, said rails comprise inlet and outlet manifolds for supplying water to the ducting members of said absorber assemblies. Preferably, the fencing panel is supported by respective upright post members which extend into the ground. Preferably, clip means detachably secure the fencing panels to the upright members.

BRIEF DESCRIPTION OF THE DRAWINGS

In order that the invention may be more readily understood and put into practical effect, reference will now be made to the accompanying drawings which illustrate a preferred embodiment of the invention and wherein:

FIGS. 3 and 4 illustrate in sectional side elevation and end elevation respectively an end connector for the absorber assembly of FIG. 2;

FIGS. 5 and 6 illustrate in plan and sectional view the connector of FIG. 3;

DETAILED DESCRIPTION OF THE PREFERRED EMBODIMENTS

Figure 1:
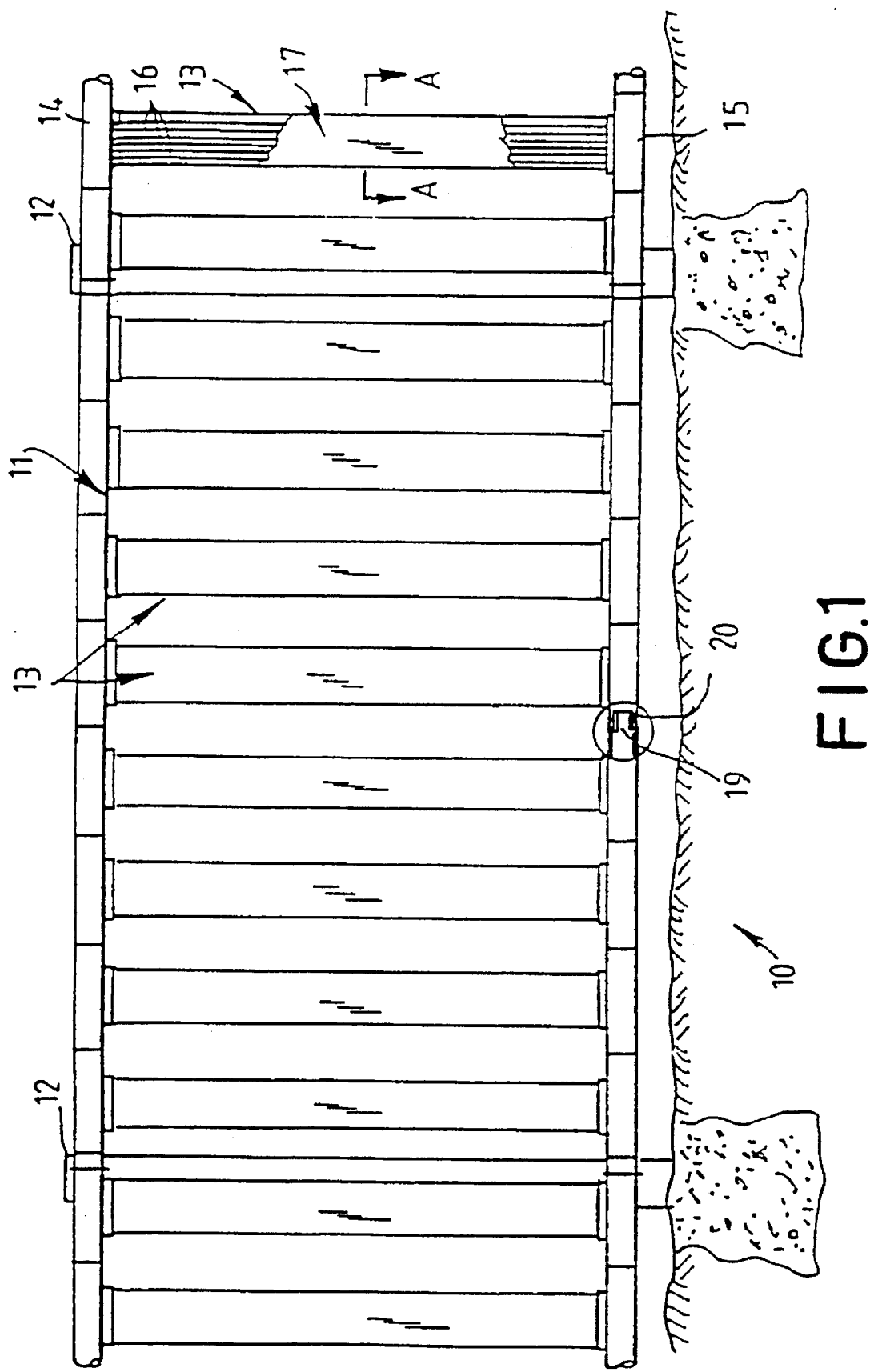
FIG. 1 illustrates in elevation view, a section of a fence constructed and incorporating solar assemblies in accordance with the present invention.

Referring to the drawings and firstly to FIG. 1, there is illustrated a fence assembly 10 according to the present invention, comprising a fence panel 11 supported by a pair of upright support posts 12 which are arranged in conventional fashion preferably in concrete foundations. The fence panel 11 is constructed of a plurality of interconnected absorber assemblies 13 which are adapted to convey and heat water when the fence panel 11 is exposed to the sun.

Figure 2:
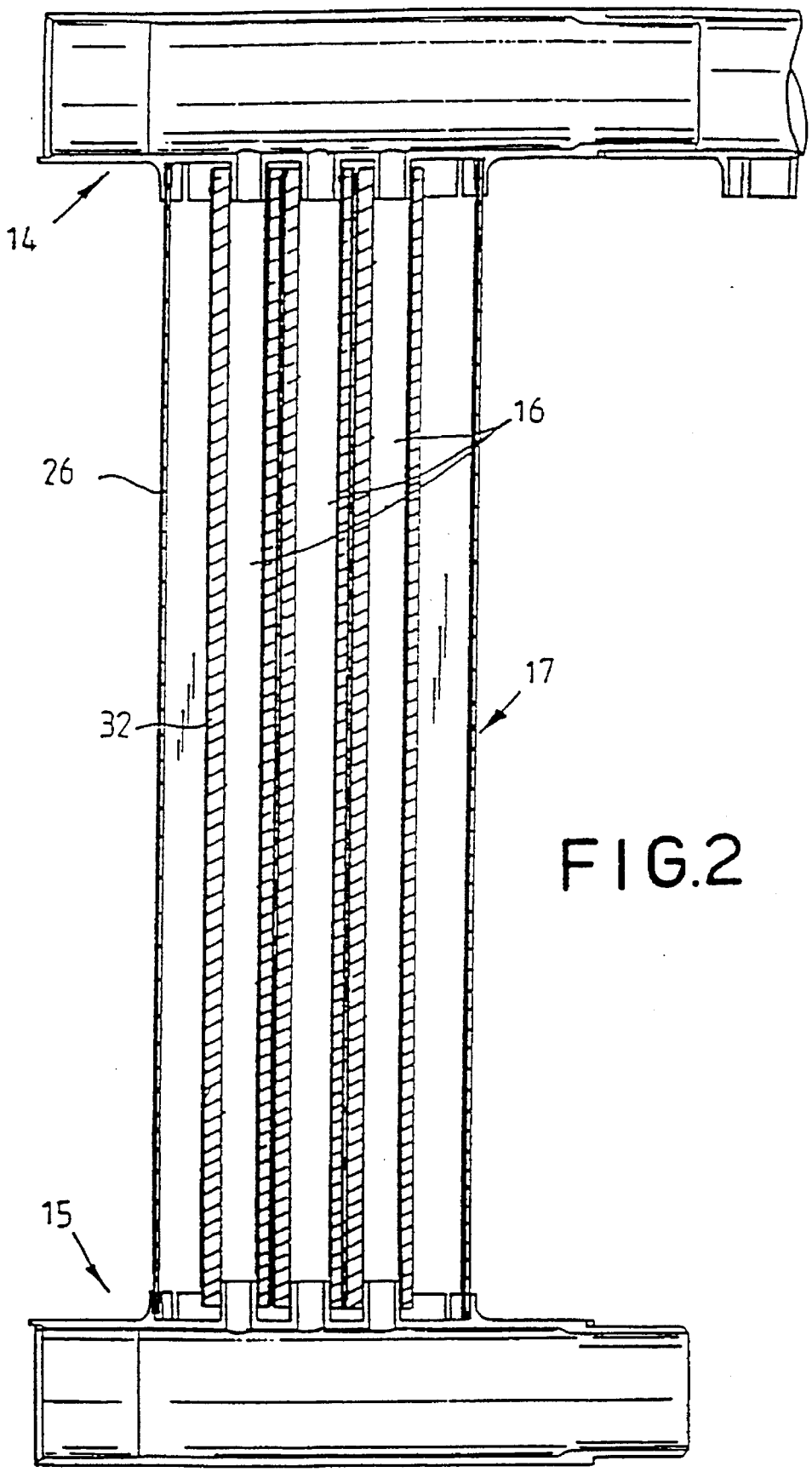
FIG. 2 is a sectional view of an absorber assembly according to the present invention.

Each absorber assembly 13 as shown more clearly in FIG. 2 includes an upper T-connector 14 and a lower T-connector 15 between which extend a plurality, in this instance three absorber tubes 16, suitably formed of LURAN-S material. Also supported between the connectors 14 and 15 and surrounding the tubes 16 is a glazing panel assembly 17.

As shown more clearly in FIGS. 3 and 4, the T-connector comprises a main tubular body portion 18 defining a reduced diameter male end 19 and a socket 20 at its opposite end for receipt of the male end 19 of an adjacent T-connector 15. Extending radially outwardly of the body portion 18 and communicating therewith are three hollow spigots 21 which are adapted to locate within the ends of respective absorber tubes 16 in the manner shown in FIG. 2. Surrounding the spigots 21 is a skirt portion 22 which is adapted to receive and locate one end of the glazing assembly 17 in the manner described further below, the skirt portion 22 being provided with slots 23 for use in draining water, for example, rain water from the region within the skirt portion 22.

The upper T-connector 14 is of similar form to the connector 15, except that the skirt portion 22 is of increased height for a purpose which will hereinafter become apparent. Furthermore, the slots 23 in the skirt portion 22 of the upper connector 14 may be eliminated. The connectors 14 and 15 are also preferably provided at one end adjacent the male end 19 with a locating recess 24 and at its opposite end with a locating key 25 adapted for receipt in a recess 24 of an adjacent connector so that alignment can be assured between adjacent connectors.

Figure 7:
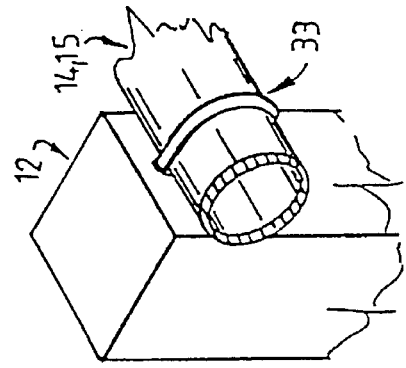
FIG. 7 illustrates in sectional view the glazing panel extrusion for formation of the glazing assembly.
Figure 8:
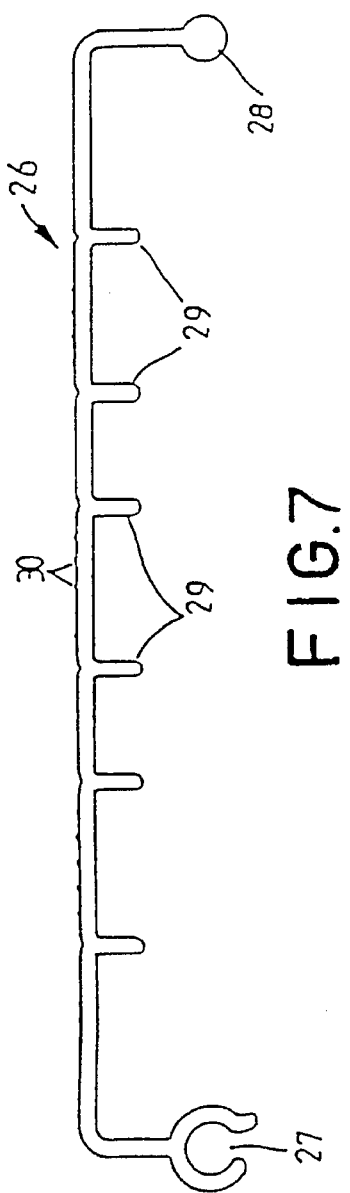
FIG. 8 is a sectional view of the absorber assembly along line A—A of FIG. 1.

The glazing assembly 17 as more clearly shown in FIGS. 7 and 8 includes two glazing members 26 which are of identical cross-sectional form preferably extruded and which include at opposite ends complementary female and male engagement members 27 and 28 which may be engaged with the members 27 and 28 of a further opposed glazing member 26 in the manner shown in FIG. 8. As shown the engagement members 27 are in the form of recesses having a reduced width entrance and the members 28 are of knob-like form in cross-section. Each glazing member 26 is provided with a series of inwardly directed parallel ribs 29 which co-operate when the glazing members 26 are interconnected to locate on opposite sides of, to engage and support, the tubes 16 as shown in FIG. 6. Preferably, the glazing members 26 are formed of a transparent or translucent material such as polycarbonate or acrylic. The glazing members 26 may also be provided on their outer surfaces with longitudinally extending diffuser ribs 30.

The tubes 16 preferably include on their opposite sides diametrically extending webs or ribs 31 which serve to increase the solar absorption area of the tubes 16. The edges of the respective ribs 31 are located adjacent to each other when assembled as shown in FIG. 8. The tubes 16 may be formed of plastics or synthetic rubber and coloured such as being black so as to maximise solar collection.

In use, a fencing panel 11 according to the invention is assembled by forming absorber assemblies 13 of the type shown in FIG. 2 with the respective tubes 16 being adhered or sealably connected at opposite ends to the spigots 21 of the respective connectors 14 and 15. The upper and lower T-connectors 14 and 15 are then interconnected with further connectors 14 and 15 with the use of adhesives between the male-female cooperating ends 19 and 20 to form a fence panel 11 of any required length. The glazing assembly 17 may then be assembled about the tubes 16 and located in position by means of the skirts 22. For this purpose, opposite glazing members 26 may be positioned on opposite sides of the tubes 16 and clipped together. The assembled members 26 may then be moved upwardly into the skirt portion 22 in the upper T-connectors 15 and then lowered to be located within the skirt portion 22 in the lower T-connectors 15, the upper extended length skirt portion 22 in the connector 14 then serving to maintain the upper ends of the glazing assembly 17 in position.

Figure 9:
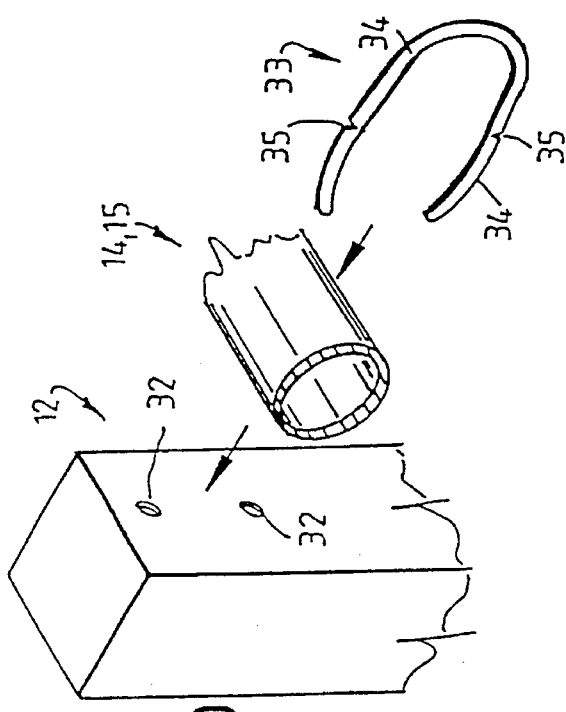
FIG. 9 illustrates a connector fitting of the fence panel attached to a supporting post.
Figure 10:
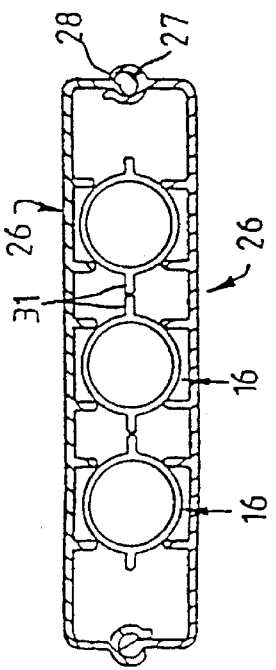
FIG. 10 illustrates the manner in which the connector fitting of the fence panel is attached to a supporting post.

The assembled fence panel 11 may then be mounted to the upstanding posts 12. For this purpose, each post 12 as shown in FIGS. 9 and 10 may be provided with spaced apertures 32 for engagement by a clip 33. The clip 33 which is of generally U-shaped form is preferably formed of zinc plated mild steel rod or other resilient material and includes a pair of legs 34 which are notched on their outer sides at 35. The clip 33 is located about a connector 14 or 15 and the legs 34 pressed together so as to be in alignment with the apertures 32 such that they may be inserted into the apertures 32 up to the notches 35. Thereafter the legs 34 can be released to spring outwardly so that the notches 35 are located about the edges of the apertures 32 to lock the clip 33 to the post 12 and hold the connector 14 or 15 in position. The clip 33 may be detached by forcing the legs 34 together so that the notches 35 are free of the apertures 32 and thereafter withdrawing the legs 34.

Pairs of apertures 32a are preferably provided at upper and lower ends of the posts 12 so that clips 33 may be used to secure upper and lower connectors 14 and 15 to the posts. The posts are suitably hollow members of conventional form. It will be apparent, however, that the fencing panels of the invention may be secured and supported in any other manner in an upright attitude.

The use of a two part glazing assembly 17 permits those assemblies to be readily detached and replaced by simply disconnecting the two halves 26, say in the event of discolouring. All the components of the fence panel 11 are preferably formed of a plastics material so as to eliminate corrosion and reduce maintenance. Water may be communicated to and from the fence panel 10 by any suitable connection to the upper and lower rails formed by upper and lower connectors 14 and 15. At the ends of the fencing panels plugs may be employed to close off the upper and lower rails while if fence panels are arranged at different levels suitable connecting couplings may be used between adjacent panels.

The term "glazing" as used throughout the specification and claims includes glass and other material which exhibit similar light or radiation transmission as glass, such as transparent or translucent plastics.

If it is desired to stiffen the glazing assembly 17, stiffening rods or members such as aluminum rods may be located between the two halves 26 in the assembled position and adjacent the opposite side connectors 27 and 28. Such stiffening members will serve to minimize lateral deflection of the glazing assembly 17 if a load is applied thereto.

In an alternative configuration, the glazing assembly 17 may be constructed in one piece such as a hollow extrusion cut to the required length with the end fittings supporting opposite ends thereto. In yet a further configuration, the absorber tubes 16 and glazing 17 may be replaced by a duct of rectangular cross-sectional form to define faces for the collection of solar energy.

While the above has been given by way of illustrative embodiment of the invention, all such modifications and variations thereto as would be apparent to persons skilled in the art are deemed to fall within the broad scope and ambit of the invention as herein defined in the appended claims.

I claim:

1. A solar absorber assembly, comprising an upper connector and a lower connector, through which water passes for solar heating of the same, at least one heat absorber tube extending between and sealably connected to said upper and lower connectors in fluid communication therewith whereby water passes between said connectors through said tube, a glazing assembly comprised of opposed first and second glazing members formed of translucent or transparent plastic material and which, when assembled, enclose said heat absorber tube, and means on said upper and lower connectors for receiving and supporting said glazing members in their assembled position, and wherein said first and second glazing members are formed with interengable connecting parts for maintaining said members in assembled position enclosing said tube.

2. The solar absorber assembly of claim 1 wherein said upper and lower connectors are provided with male and female ends for interconnection with corresponding parts of adjacent connectors.

3. The solar absorber assembly according to claim 2 wherein said connectors have tubular body portions and said male and female ends comprise a tubular spigot portion at one end of each connector and a tubular socket portion at the other end of each connector.

4. A fencing panel including a plurality of spaced apart solar absorber assemblies of the type recited in claim 2, said male and female ends of adjacently disposed connectors are being interconnected to define upper and lower rails for said fencing panel, and wherein two or more heat absorber tubes are mounted on each assembly.

5. The fencing panel according to claim 4 wherein said rails comprise inlet and outlet manifolds for supplying water to the heat absorber tubes of said solar absorber assemblies.

6. The solar absorber assembly according to claim 1 wherein said glazing members are formed with inwardly directed ribs which engage and support said heat absorber tube.

7. The solar absorber assembly according to claim 1 wherein each of said upper and lower connectors comprise a body portion and include a spigot extending outwardly from said body portion for respective engagement by one end of said heat absorber tube.

8. The solar absorber assembly according to claim 1 wherein said heat absorber tube is of generally tubular form and is formed with diametrically extending webs on each side thereby to increase the solar absorption area of said tube.

9. A solar absorber assembly, comprising an upper connector and a lower connector, through which water passes for solar heating of the same, at least one heat absorber tube extending between and sealably connected to said upper and lower connectors in fluid communication therewith whereby water passes between said connectors through said tube, a glazing assembly comprised of opposed first and second glazing members formed of translucent or transparent plastic material and which, when assembled, enclose said heat absorber tube, and means on said upper and lower connectors for receiving and supporting said glazing members in their assembled position, and wherein said first and second glazing members are identical in cross-section and include at their opposite longitudinal edges interengagable connecting parts for maintaining said glazing member in their assembled position but providing for releasable interconnection of said glazing members.

10. The solar absorber assembly according to claim 9 wherein said glazing members are formed with inwardly directed projections which engage and support said heat absorber tube.

11. A solar absorber assembly, comprising an upper connector and a lower connector, through which water passes for solar heating of the same, at least one heat absorber tube extending between and sealably connected to said upper and lower connectors in fluid communication therewith whereby water passes between said connectors through said tube, a glazing assembly comprised of opposed first and second glazing members formed of translucent or transparent plastic material and which, when assembled, enclose said heat absorber tube, and means on said upper and lower connectors for receiving and supporting said glazing members in their assembled position, said receiving and supporting means comprising skirts formed on each said connector outwardly of the heat absorber tube, and wherein said first and second glazing members are formed with interengageable connecting parts for maintaining said members in assembled position enclosing said tube.

* * * * *